Sept. 1, 1970   E. J. CHALFANT ET AL   3,526,411
SELF-CLOSING REVERSIBLE CHUCK
Filed May 15, 1968   2 Sheets-Sheet 1
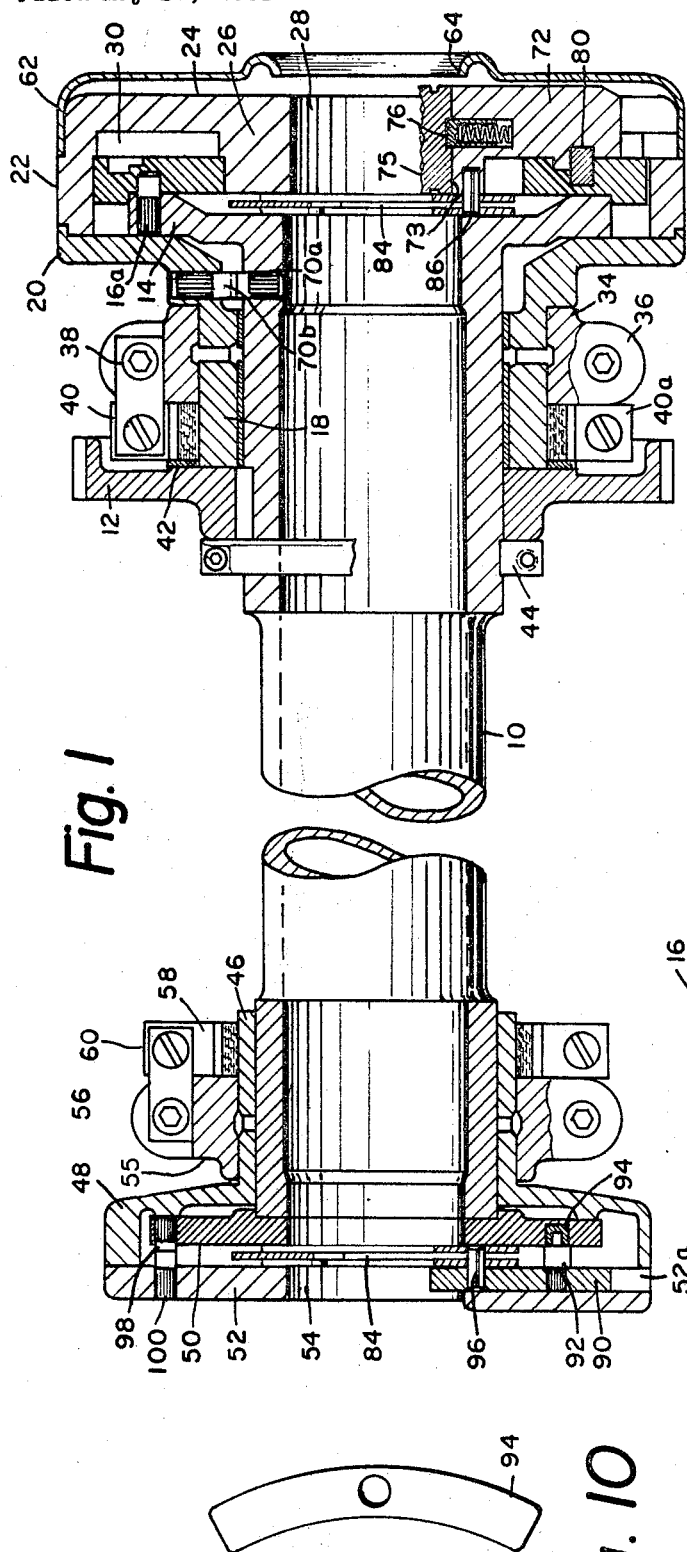
Fig. 1
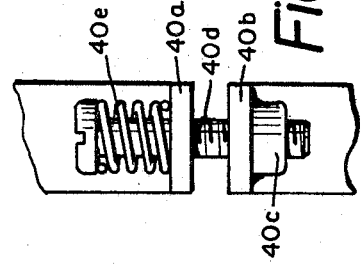
Fig. 2
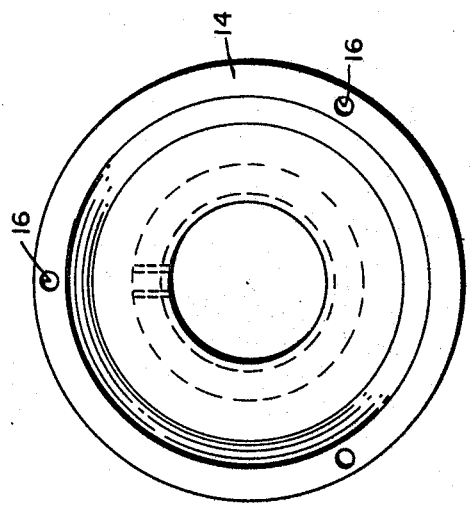
Fig. 3
Fig. 10
INVENTOR
Edward J. Chalfant
Anton J. Janik
By J. D. Douglas
Their Atty Sept. 1, 1970   E. J. CHALFANT ET AL   3,526,411
SELF-CLOSING REVERSIBLE CHUCK
Filed May 15, 1968   2 Sheets-Sheet 2

INVENTOR
Edward J. Chalfant
Anton J. Janik
By
J. W. Lengles
their atty

United States Patent Office 3,526,411
Patented Sept. 1, 1970

3,526,411
SELF-CLOSING REVERSIBLE CHUCK
Edward J. Chalfant, Elyria, and Anton J. Janik, North Ridgeville, Ohio, assignors to Emerson Electric Co., St. Louis, Mo., a corporation of Missouri
Filed May 15, 1968, Ser. No. 729,236
Int. Cl. B23b *31/16, 31/10*
U.S. Cl. 279—114          12 Claims

ABSTRACT OF THE DISCLOSURE

A spindle is rotated by a reversible motor and is connected to and drives a scroll plate which has three eccentric grooves in its face displaced from each other by 120° and intersecting each other. A head is rotatably mounted on the spindle, its rotation being resisted by a brake shoe, the tension of which may be adjusted. The head is formed with three radial ways and a chuck jaw is disposed in each way. Each chuck jaw is interconnected to a groove in the scroll plate by an arcuate shoe. Cooperating stop means is provided on the spindle and chuck head to limit the relative rotation between the two to slightly less than 360°. Centering means for centering the stock between the chuck jaws includes three links having cam slots in their ends with the adjacent ends of the links placed in overlapping relation to each other on pins carried by the chuck jaws.

---

This invention relates to self-energizing reversible chucks. It is an improvement over that shown in U.S. Pats. Nos. 2,744,757 and 2,932,524.

It is frequently desirable to provide a chuck which will automatically close the jaws upon a workpiece and wherein the jaws will close and grip the workpiece in either direction of rotation. One particular place where such a chuck is useful is in conjunction with machines for forming right or left-hand threads on pipes or rods.

Heretofore chucks have been proposed which automatically increase their gripping power, regardless of the direction of rotation, upon the application of a force to the stock which resists the turning torque applied to the stock. Such machines required a first manual closing of the jaws and only the ultimate gripping power was realized when the stock was engaged with a tool such as a threading die.

Other machines were proposed where the jaws were automatically advanced, but the jaws were interconnected by a complicated linkage which soon became worn and prevented the jaws from holding the work perfectly centered. In addition, separate control means had to be operated to determine the direction of rotation in which the jaws gripped.

The present invention contemplates a chuck wherein the jaws are first automatically advanced into engagement with a workpiece and wherein the resistance to the driving torque when an operation is being performed on the workpiece increases the gripping action of the chuck jaws on the workpiece independent of and to a much greater extent than can be obtained from the initial jaw advancing means. The chuck is fully automatic requiring no hand operations other than the insertion of the stock and the operation of a switch to turn the motor "on" or "off" to "reverse" it.

Since the operation is substantially automatic, it is more efficient because the operator does not have to operate a hand wheel to close the chuck jaws.

In addition to the foregoing, means is provided to automatically center the work in the chuck jaws.

In addition to the foregoing, means is provided to automatically center the work in the chuck jaws.

Still other advantages of the invention and the invention itself will become more apparent from the following description of an embodiment thereof which is illustrated by the accompanying drawings and forms a part of this specification.

In the drawings:

FIG. 1 is a vertical medial section of a chuck and centering assembly;

FIG. 2 is a fragmentary view on an enlarged scale of a brake tensioning means;

FIG. 3 is an end view of the spindle, on a reduced scale;

FIG. 10 is a side elevational view on an enlarged scale of a work centering jaw operating shoe.

Figure 9:
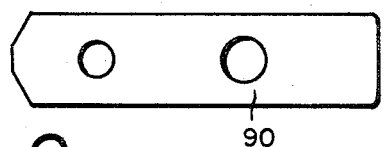
FIG. 9 is an elevational view on an enlarged scale of a work centering jaw.

Briefly, the invention contemplates a hollow shaft or spindle which is rotated by a reversible motor to drive a scroll plate which has three eccentric grooves on its face, the grooves being displaced from each other 120° but intersecting each other. A chuck head is rotatably mounted on the spindle and carries chuck jaws in ways which are opened and closed by shoes disposed in the scroll plate grooves and connected to the jaws. Friction means holds the head against movement relative to the scroll plate, causing the jaws to be moved in the ways until they contact the workpiece. Final gripping of the jaws with the workpiece is effected by a jaw insert rotatably mounted in the end of each jaw and which tilts in response to resistance to driving torque.

Means is also provided operated by the jaws to cause the workpiece to be moved to a centered position relative to the jaws as the jaws are moved toward the workpiece.

More specifically ad as best shown in FIG. 1, a hollow shaft or spindle 10 is driven by drive gear 12 from a reversible motor, not shown. One end of the shaft, to the right as viewed in FIG. 1, is provided with an integral outwardly extending circular flange or head 14 which has openings 16 in which are disposed drive pins 16a disposed in circular alignment 120° apart (see FIG. 3), with their axes parallel to the axis of the shaft. At the other end, to the left, the shaft is provided with a centering drive scroll secured to the end of the shaft.

A chuck plate is rotatably associated with the shaft and comprises a bearing holding sleeve portion 18 surrounding the shaft and having a circular flanged portion 20 that extends outwardly into abutting engagement with the head 14 and then beyond the head. The chuck plate has a chuck cap secured thereto which includes a skirt part 22 secured to the chuck adjacent the edge and formed with a body 24 which extends toward the axis of the shaft and terminates in a central hub 26 having an axial bore 28. The plate is provided with a ring shaped cavity in which a scroll plate 30 is supported, seats being provided on the hub and inner portion of the skirt therefor.

Figure 4:
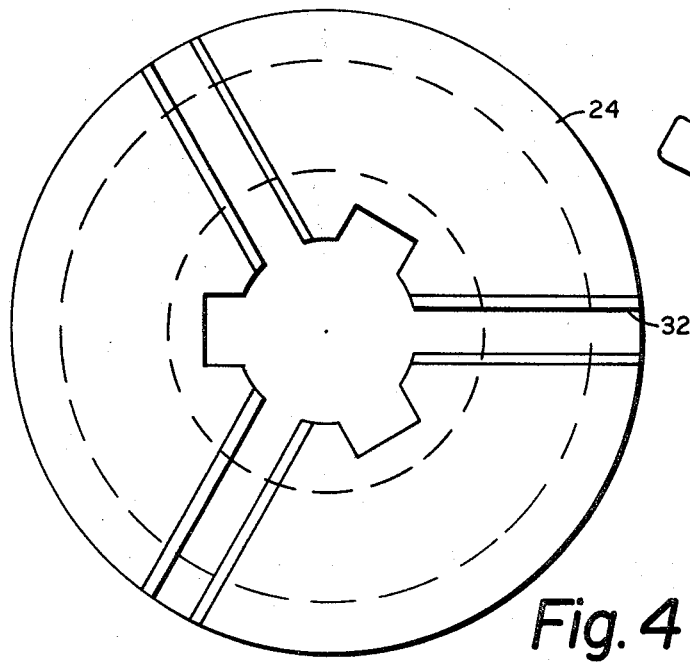
FIG. 4 is an end view of the chuck cap.

The cap is formed with a plurality of ways 32, FIG. 4, disposed 120° apart which open through the outer face.

Support means for the chuck and shaft assembly includes a bearing 34, in which the sleeve 18 is disposed, and which has ears 36 whereby it may be supported by a suitable support, not shown. The bearing is disposed abutting a shoulder on the sleeve 18. Rearwardly of the bearing and connected by links 38 thereto is a brake shoe 40 which surrounds and is in frictional engagement with the sleeve 18. A thrust washer 42 is interposed between the brake shoe and the gear 12. Rearward movement of the gear 12, and the parts associated with the chuck, on the shaft is controlled by a split collar 44 which is disposed in a groove on the shaft.

At the other (left) end of the drive shaft a work centering head is provided and includes a sleeve 46 which surrounds the shaft and is provided with a circular head portion 48 which extends outwardly and houses a scroll plate 50 which is fastened to the end of the shaft. A cap 52 is secured to the head 48, being provided with an opening 54 coaxial with the shaft opening. This end of the shaft is likewise supported by a rear bearing 55 provided with ears 56 which enable it to be supported on a support, not shown. Likewise a brake shoe 58 surrounds the sleeve 46 and is connected to the ears 56 by links 60.

The end of the chuck may be enclosed by a cap 62 of pressed steel having a skirt seated on the skirt part 22 of the head and having an axial opening 64. It is held in place by screws, not shown, threaded into the body 24.

Figure 5:
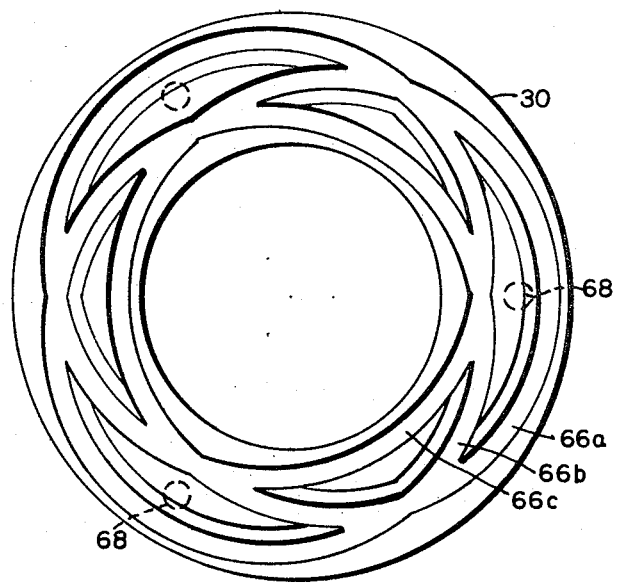
FIG. 5 is an end view of the scroll plate.
Figure 7:
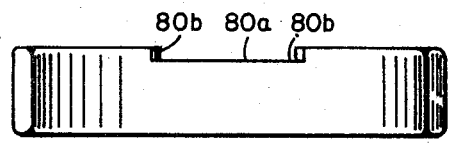
FIG. 7 is a plan view on an enlarged scale of an operating shoe.

The chuck scroll plate 30, FIG. 5, is provided with three circular ways 66a, 66b and 66c, each eccentrically disposed in the face of the plate and with the points where they are closest to the edge of the plate being displaced 120° from each other and with their eccentricity such that they intersect each other. The amount of eccentricity determines the length of travel of the jaws.

The chuck scroll plate is driven from the shaft 10 by the pins 16 which extend into recesses 68 in the scroll plate.

Relative movement of the drive shaft and the chuck head is limited to slightly less than 360° by a first hardened stop pin 70a rigidly carried by the drive shaft and a second hardened stop pin 70b rigidly carried by the head. The pins, as best shown in FIG. 1, are radially disposed in the shaft and head, in longitudinal alignment with each other and of such a length that they engage wtih each other upon rotation of the shaft relative to the head. The relative position of the pins when they contact each other is such that at this time the chuck jaws will be substantially fully opened. Each pin could be provided with a semi-cylindrical recess in the side to enable a nesting arrangement and enable still further relative rotation of the parts.

Figure 6:
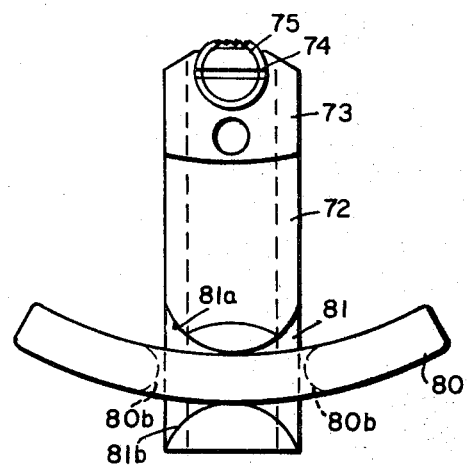
FIG. 6 is an end elevational view on an enlarged scale of one of the jaws and an operating shoe.

Each chuck jaw, FIG. 6, comprises a body 72 the sides of which are formed with ways complementary to ways 32 and which is slidable therein radially of the chuck head. The end of each jaw is provided with a head 73, a portion of which extends rearwardly and the entire head being formed with a semi-circular socket 74 in which a generally cylindrical jaw insert 75 is disposed. The jaw insert is provided with a serrated work gripping surface which extends across a cord of the jaw. Opposite to that surface there is provided a flat seat which is engaged by a spring pressed pin 76, FIG. 1, disposed in a blind hole extending longitudinally of the jaw, the flat end of which engages with the seat and keeps the holding surface centered relative to the jaw but allows it to tilt in response to the torque when driving a workpiece. It is similar to U.S. Pat. No. 2,778,652 and operates in substantially the same manner.

The jaws are moved inward (closed) and outward (open) by rotary movement of the scroll plate 30 relative to the chuck body 24. This is effected by arcuate shoes, one for each chuck jaw, disposed in each of the eccentric grooves and each one connected to its respective jaw.

Each shoe 80 is an arcuate body of rectangular crosssection, the radius of the arc being the same as that of the eccentric grooves 66a, 66b, 66c. Its mid-portion is formed with a shallow notch at 80a with the end walls 80b of the notch, each being formed with a curved surface. The distance between the end walls of each recess is slightly larger than the width of the corresponding chuck jaw. The shoes are disposed in a slot 81 in the back edge of the jaw, the walls 81a and 81b of which are curved in opposite directions, coming closest together at the center line of the chuck jaw, at which points the walls are sufficiently far apart as to allow free tilting movement of the shoe therein. When in position the curved end walls 80b of the shoe extend along opposite sides of the chuck jaw beyond the slot 81. As the scroll plate rotates relative to the head the shoes are moved radially by the eccentric grooves. This radial movement is transmitted from the sides of the shoes to one or the other of the curved sides 81a or 81b of the chuck jaws carrying the jaws 73 inward or outward. The shoes are held in the jaws by the sides 80b engaging with the sides of the jaws. The curved surfaces 81a and 81b allow the shoes to tilt relative to the jaws as they move around in the eccentric grooves and take different angles relative to the centerline of the jaws. The shoes are of sufficient length that they bridge the points of intersection of the grooves with each other.

Figure 8:
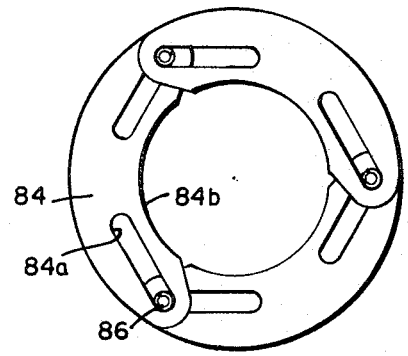
FIG. 8 is an elevational view of a centering mechanism.

Means is provided for automatically centering the workpiece relative to the jaws when the jaws close and preventing the workpiece from becoming lodged between the sides of a pair of the jaws as they close. It comprises three arcuate guide links 84, FIG. 8, provided with straight but angularly disposed slots 84a extending from the end portion toward the mid-section. These links are assembled between the head 14 and the hub 26 of the cap by placing the ends of the links in overlapping relation with the slots 84a over roll pins 86 which are set into the heads 73 of the chuck jaws and projecting rearwardly. The links thus bridge the space between the jaws. As the jaws move inward the roll pins move in the slots from the outer ends toward the inner ends and, due to the slanting nature of the slots, this causes the links to all move toward each other which, in turn, causes the inner arcuate surfaces 84b to move inwardly in unison with the closing of the chuck jaws. Thus a small workpiece is moved into a centered position relative to the chuck jaws.

Means is also provided for centering the stock in the other end of the assembly and includes the cap 52 which is secured to the work centering head 48 and is provided with three radial ways 52a in which work centering jaws 90, FIG. 9, are disposed. Each jaw is provided with a pin 92 which extends toward the scroll plate 50 and has pivotally mounted thereon an arcuate shoe 94, FIG. 10, which extends into and is operated by grooves in the scroll plate similar to the grooves in the chuck scroll plate.

Likewise there are provided three links 84 identical to the links in the chuck described which are assembled with roll pins 96 set into the jaws and which operate in an identical manner to that described for the chuck head.

Stop pin means 98 and 100 are provided to limit the movement of the scroll plate and head relative to each other in the same manner as the pins 70a and 70b, except that they are disposed parallel to the axis of the spindle shaft instead of being radially disposed.

As previously stated, brake shoes 40 and 58 surround the bearing sleeve 18 of the chuck assembly and sleeve 46 of the work centering head assembly and were connected to the supports 34 and 54, respectively, by links 38 and 60. These links hold the brake shoes from turning with the sleeves and the brakes are arranged to exert friction on the sleeves which causes the relative movement between the scroll plates and the head assemblies. The tension on the brake shoes is controlled and adjustable. Each shoe, to one side (the bottom as viewed in FIG. 1) is provided with outwardly extending spaced ears 40a and 40b, FIG. 2. A nut 40c is welded to the underside of the bottom ear and an adjusting screw 40d extends freely through an opening in the top ear and is threaded into the nut on the bottom ear with a helical spring 40e disposed between the head of the screw and the top of the ear 40a.

The above chuck and centering assembly are ideally suited for use on a machine of the type shown in U.S. Pat. No. 2,768,550, although obviously it may be used in any place where a reversible self-closing chuck is desired.

The operation of the device is as follows: Assuming that a workpiece, which may be a piece of pipe or a rod, is to be rotated, the drive gear is first rotated by a reversible motor, not shown, to cause the chuck and work centering jaws to open. It being further assumed that a right-hand threading operation is to be performed, it is necessary to have the jaws close when the chuck is rotating counterclockwise, as viewed from in front of or the right-hand end of the chuck, as viewed in FIG. 1. The work is revolved and the threading die is held against rotation. To this end, the gear is moved clockwise which rotates the spindle or hollow drive shaft clockwise. Assuming that pins 70a and 70b were out of contact with each other or the pin 70b was on the far side of the pin 70a, the bearing sleeve 18 would be held by the brake and the scroll plate 30 be rotated relative to the head. If the pins 70a and 70b were in contact and positioned as stated above, the jaws of the chuck and the centering device would first be moved inwardly to the limit of their movement and then outwardly until such a time as the pin 70a engaged with pin 70b which would leave the parts in the position shown in FIG. 1, but with the pin 70a in front of pin 70b as viewed in the figure, with the jaws and the centering means all retracted to their greatest extent.

The machine is now ready to receive the rod or pipe which is normally inserted from the left end through the workholder, through the spindle and beyond the chuck jaws the desired amount. The motor is then energized to rotate the gear 12 in a counterclockwise direction. The shaft 10 is rotated and with it the pin 70a which moves toward the viewer away from the pin 70b. This rotates the head 14 and it in turn, by the pins 16, drives the scroll plate counterclockwise. The bearing sleeve 18 being held by the brake 40 and with it the parts 20, 22 and the chuck body are held against movement. Since the body 24 does not move but the scroll plate 30 does move, the shoes move relatively in the grooves 66a, 66b and 66c and are carried inward along with the chuck jaws until such a time as the jaws engage with the workpiece. As soon as the jaws engage with the workpiece, the relative movement substantially cases and the workpiece is now driven.

The advancement of the jaws as stated, occurs in less than one-half revolution of the spindle and causes the teeth on the serrated jaw insert to engage with the workpiece. It can be seen that because of the high angle of the grooves in the scroll plate relative to the jaws the gripping may not be such as would hold the work against slippage in the jaws because of insufficient pressure applied. The ultimate tightening and firm gripping of the work occurs because, now that the jaws are rotating the work, any resistance to turning of the workpiece causes the jaw inserts 75 to rotate in their sockets. This causes the flat work engaging surface to tilt and drive the teeth on the jaw insert firmly into engagement with the workpiece.

As the chuck jaws move inward the pins 86 slide in the slots 84a, camming all three links inwardly. The curved stock engaging surfaces 84b engage with the stock and move it into position centered relative to the chuck jaws.

Likewise the stock (bar or rod) is centered at the other end of the assembly by the centering jaws 90 and the links 84 which cooperate with the jaws in substantially the same manner as the jaws and links at the other end.

When the operation performed on the workpiece is completed, reversal of the motor causes immediate release of the workpiece. The friction on the sleeves 18 and 46 by the brakes is sufficient to cause the relative movement between the scroll plate and chuck head parts to provide immediate release. The jaws automatically only open and stop when opened to their full extent because of the contact of the pins 70a and 70b with each other, which limit the relative movement between the scroll plate and the head.

When it is required to move the workpiece in the other direction, it is removed from the chuck and the motor energized to move the scroll plate in one substantially complete revolution. It being assumed the jaws were fully open at the start, the relative movement between the scroll plate and the head would first cause the jaws to move inward to their fullest extent and then outward at which time the stop pins 70a and 70b would prevent the further relative movement between the scroll plate and the head and the assembly would now be ready for insertion of the stock.

Having thus described the invention in an embodiment thereof it will be appreciated that numerous and extensive departures may be made therefrom without departing from the spirit or scope of the invention as defined by the appended claims.

What is claimed is:

1. A chuck having a head with radially extending ways therein and jaws slidably disposed in said ways, means for moving said jaws inward and outward of the chuck axis comprising a member rotatable relative to the head in either one of two opposite directions and formed with a channel for each jaw, each jaw having drive means connected thereto and extending into driven engagement with the walls of one of said channels, each of said channels being configured and positioned to cause the drive means to move the jaws in one direction upon movement of the drive means in either direction from a given specfic position thereof in the channels.

2. A device as described in claim 1, wherein said channels are eccentrically disposed on said member.

3. A device as described in claim 2, wherein said channels are equally circumferentially spaced from each other.

4. A device as described in claim 1, wherein said channels intersect each other and each of said drive means connected to the jaws is an arcuate member having a width slightly less than the channel width and a length such as to bridge the point of intersection of the channels with each other.

5. A device as described in claim 4, wherein said jaws are each provided with a transverse groove and said drive means connected to the jaws is rockably disposed in said groove.

6. A device as described in claim 5, wherein said drive means is formed for engagement with the sides of said jaws.

7. A device as described in claim 6, wherein said transverse groove is defined by arcuate side walls which diverge from each other in opposite directions on each side of a center line longitudinally through the jaw.

8. A device as described in claim 1, wherein drive means is provided for said rotatable member and friction means is provided in engagement with the head for restricting its rotation thereof relative to said rotatable member.

9. A device as described in claim 8, wherein said friction means is adjustable to provide a predetermined amount of friction.

10. A device as described in claim 1, wherein stop means is provided to prevent relative rotation between the head and the rotatable member when said jaws are moved to their outermost position.

11. A device as described in claim 10, wherein said stop means comprises a first abutment member carried by the head and a second abutment member carried by the rotatable member in overlapping relation to each other when they are rotated into contact.

12. The device as described in claim 1 wherein each of said channels is an endless groove.

References Cited

UNITED STATES PATENTS

| 1,442,107 | 1/1923 | Vernaz | 279—114 |
| 2,932,524 | 4/1960 | Pealer | 279—114 |
| 2,974,367 | 3/1961 | Doering | 279—114 X |

ROBERT C. RIORDON, Primary Examiner

D. D. EVENSON, Assistant Examiner